C. DE SHON.
WATER ECONOMIZER.
APPLICATION FILED MAY 20, 1910.

987,616.

Patented Mar. 21, 1911.

Witnesses:
D. E. Neibel
N. S. Hillyard

Inventor:
Clarence DeShon
by
Eugene Ayres,
Attorney.

UNITED STATES PATENT OFFICE.

CLARENCE DE SHON, OF ST. JOSEPH, MISSOURI, ASSIGNOR OF TWO-THIRDS TO AARON T. MONTGOMERY AND ROY R. EARHART, OF ST. JOSEPH, MISSOURI.

WATER-ECONOMIZER.

987,616.   Specification of Letters Patent.   Patented Mar. 21, 1911.

Application filed May 20, 1910. Serial No. 562,443.

*To all whom it may concern:*

Be it known that I, CLARENCE DE SHON, a citizen of the United States, residing at St. Joseph, in the county of Buchanan and State of Missouri, have invented certain new and useful Improvements in Water-Economizers, of which the following is a specification.

The object of my invention is to provide a device by which water in tanks, troughs, and similar receptacles may be automatically prevented from overflowing and wasting.

I accomplish my object by the mechanism illustrated in the accompanying drawings, in which,—

Figure 1:
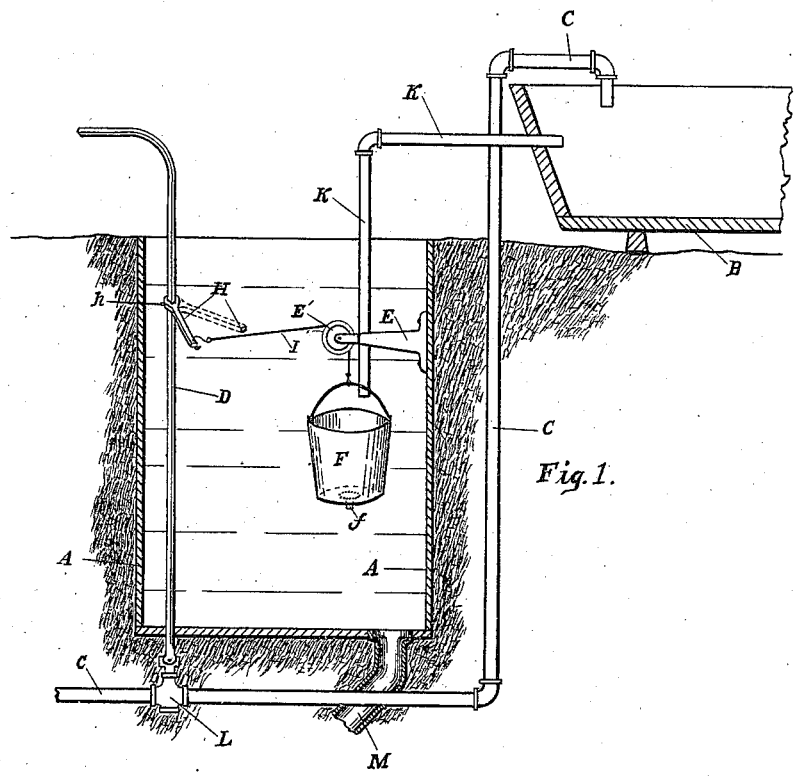
Figure 2:
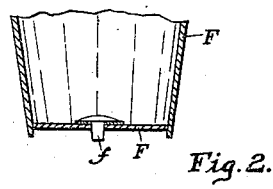

Figure 1 is a vertical section view of an empty box, trough, connecting water pipes and a bucket having a trap bottom and connections with a lever and set screw and Fig. 2 is a detail of the lower part of the bucket and the trap bottom thereof.

Similar letters refer to similar parts in both views.

In the drawings A illustrates a box set in an excavation in the ground, its top level with the surface. But such boxes may be built partly or entirely above ground. B is a tank or trough. C is a water supply pipe. D is a rod, its outer curved end serving as a handle. E is a support rigidly attached inside said box, its outer end carrying a pulley wheel E'. F is a bucket provided with a trap bottom $f$ which when pressed up permits the water in the bucket to escape. H is a lever with a set screw $h$ holding the same rigid on rod D. I is a chain or cable carried on said pulley E', one end connected with said lever, the opposite end connected with the bail of said bucket. K is a safety pipe, one end opening into said tank or trough, its other end adapted to empty into said bucket. L is a valve at the base of said rod which is operated by said rod to turn on and shut off the water for the trough which passes through said supply pipe. When the water is being turned on said rod at the same time carries lever H into the position shown in Fig. 1. When the water in the tank or trough reaches a level above the end of the safety pipe that projects thereinto it runs through said safety pipe emptying into said bucket. When said bucket has partially filled with this water from the tank or trough the weight thereof draws said lever by means of chain or cable I into the position shown by dotted lines in said Fig. 1, the bucket in descending, turning said rod and closing said valve L thus automatically shutting off the water from passing through the supply pipe into the tank or trough. In the meantime the bucket having descended to the bottom of the box its trap bottom has been pushed open, permitting the water in the bucket to empty, the water passing out of the box through waste-water pipe M. When it is found that the water in the tank or trough is low, it is only necessary to again turn on the water by means of said handle, rod and valve. When the water has again reached the level of said safety pipe in the tank it will again flow through said safety pipe into the bucket and be carried automatically down by the operation hereinbefore described, thus again closing said valve and shutting off the flow of water.

What I claim and desire to secure by Letters Patent, is:—

1. In a device of the kind described the combination of a boxing underground, a tank adjacent thereto above ground, a waste water pipe in the bottom of said boxing and a bucket with trap bottom, a water supply pipe spaced from said boxing underneath and at the side thereof, its upper end bent over said tank, a rod vertical in said boxing, its upper end projected above the same and above ground serving as a handle, a valve forming connection underneath said boxing with the lower end of said rod and with said supply pipe to admit water into said tank when the rod is turned from its normal position, a support rigid on the inside of said boxing, a pulley wheel on the end thereof, a short lever rigid at one end on said rod, a cable extending across to and carried by said pulley, one end engaging with said lever and its other end with the bail of said bucket, and a safety pipe to drain a surplus of water from said tank down into said bucket, said surplus water carrying said bucket downward, the cable and lever thereby turning said rod to its normal position and shutting off the water, substantially as described.

2. The combination with a boxing, a tank adjacent to and on a line horizontally above the same, and a water supply pipe having tank connection, of an upright rod the upper handle end thereof above ground, the lower end thereof having valve connection with the supply pipe through and beneath said boxing, a support near the top of said boxing rigid on the inside thereof, a pulley on the end thereof, a short lever rigidly attached by set screw to said rod and a cable extending horizontally to and carried on said pulley, one end connecting with said lever, the other end with a bucket to receive surplus water from said tank and as filled, automatically in its descent to cut off the flow of water into the tank, substantially as shown forth.

3. In a water cut-off the combination with a water supply pipe provided with a valve, a tank under the discharge end thereof and a waste water pipe to drain off surplus water from said tank, of a boxing spaced from and on a line horizontally below said tank, a vertical rod adjacent to one side of and extending through the bottom of said boxing and above its top and having connection with said valve, a support rigid on the opposite side of said boxing, its outer end carrying a pulley wheel, a short lever attached to said rod by set screw on a line horizontal with said support and pulley, said lever having cable connection over said pulley with a bucket having a trap bottom adapted to receive surplus water and in its descent, through its connections, to automatically close said valve, substantially as set forth.

In testimony whereof I affix my signature in presence of two witnesses.

CLARENCE DE SHON.

Witnesses:
SUSAN LAWRENCE,
EUGENE SILVERMAN.

Copies of this patent may be obtained for five cents each, by addressing the "Commissioner of Patents, Washington, D. C."